(12) United States Patent
Kim

(10) Patent No.: US 11,691,509 B2
(45) Date of Patent: Jul. 4, 2023

(54) INTEGRATED CONTROL APPARATUS FOR AUTONOMOUS DRIVING VEHICLE

(71) Applicants: HYUNDAI MOTOR COMPANY, Seoul (KR); KIA MOTORS CORPORATION, Seoul (KR)

(72) Inventor: Eun Sik Kim, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 775 days.

(21) Appl. No.: 16/506,537

(22) Filed: Jul. 9, 2019

(65) Prior Publication Data

US 2020/0324773 A1 Oct. 15, 2020

(30) Foreign Application Priority Data

Apr. 9, 2019 (KR) ........................ 10-2019-0041332

(51) Int. Cl.
*B60K 26/02* (2006.01)
*B60K 20/02* (2006.01)
(Continued)

(52) U.S. Cl.
CPC ............. *B60K 26/02* (2013.01); *B60K 20/02* (2013.01); *B60K 37/06* (2013.01); *B60T 7/10* (2013.01);
(Continued)

(58) Field of Classification Search
CPC ............. A61B 5/7475; A63F 13/5255; A63F 2009/2407; A63F 2007/3681; A63F 13/20; A63F 13/21; A63F 13/42; A63F 13/422; A63F 13/803; A63F 13/98; A47B 2021/0385; B60K 26/02; B60K 20/02; B60K 37/06; B60K 2026/029; B60K 2370/126; B60K 2370/135; B60K 2370/171; B60K 2370/175; B60K 2350/1016; B60K 2370/122; B60K 2370/1515; B60K 28/00; B60T 7/10; B60T 7/107; B60T 7/102; B60T 8/1818; B60T 11/206; B62D 1/12; B62D 1/14;
(Continued)

(56) References Cited

U.S. PATENT DOCUMENTS 5,086,870 A 2/1992 Bolduc
2005/0062721 A1 3/2005 Hsu et al.
(Continued)

FOREIGN PATENT DOCUMENTS

EP 2481637 B1 5/2014
JP H05-221272 A 8/1993
(Continued)

*Primary Examiner* — Christian Chace
*Assistant Examiner* — Katherine Marie Fitzharris
(74) *Attorney, Agent, or Firm* — Morgan, Lewis & Bockius LLP

(57) ABSTRACT

The present disclosure relates to an integrated control apparatus for an autonomous driving vehicle, in which operation for accelerating, braking, and steering of a vehicle is implemented through one integrated lever and buttons for starting and shifting of a vehicle are disposed on one case together with the integrated lever. Accordingly, the integrated control apparatus can be easily used for an autonomous driving vehicle.

15 Claims, 11 Drawing Sheets

(51) Int. Cl.
  *B60K 37/06* (2006.01)
  *B60T 7/10* (2006.01)
  *B62D 1/14* (2006.01)
  *B62D 1/12* (2006.01)
  *B62D 1/24* (2006.01)

(52) U.S. Cl.
  CPC ............ *B60T 7/107* (2013.01); *B62D 1/12* (2013.01); *B62D 1/14* (2013.01); *B62D 1/24* (2013.01); *B60K 2026/029* (2013.01); *B60K 2370/126* (2019.05); *B60K 2370/135* (2019.05); *B60K 2370/171* (2019.05); *B60K 2370/175* (2019.05)

(58) Field of Classification Search
  CPC ...... B62D 1/24; B62D 1/18; B60G 2600/204; B05B 11/3009; B05B 11/3029; B05B 11/3056; B05B 11/3057; B05C 17/0123; B05C 17/0126; B05C 17/013; B21B 31/28; B21J 7/12; B23D 17/08; B23D 25/10; B23D 45/046; B23D 45/066; B25B 5/104; B25B 5/106; B25B 5/108; B25B 13/18; B25B 13/32; B29C 66/8221; B29C 2045/2834; B29C 2045/4031; B29C 2045/5016; B30B 1/02; B41F 27/1243; B41J 7/02; B41J 7/12; B41J 7/14; B41J 7/16; B41J 7/20; B41J 7/28; B41P 2219/134; B44B 5/0023; B44B 5/0038; B60H 1/00857; B60L 2250/24; B60L 3/00; B60Q 1/1469; B60Q 1/1476; B60R 21/05; B60R 25/008; B60R 25/02144; B61L 19/04; B61L 2210/02; B62L 3/02; B62M 2701/0053; B63H 16/18; B65C 2210/0045; B65D 45/34; B65D 47/249; B65D 83/201; B65D 83/206; B65D 2543/00888; B65D 2543/00351; B66B 1/38; B66D 3/02; B66D 3/14; B67B 7/0429; B67B 2007/0494; B67C 7/0093; B67D 7/50; B67D 2001/0089; B01D 5/0018; B01F 23/231263; B01F 2003/04141; B01F 2003/04304; B29L 2031/773; B60W 30/00; B60W 60/00; B60W 60/0059; B61D 27/0063; B64C 2201/141; B64G 2001/247; F16H 59/08; F15B 2211/6346; F02G 2255/10
  See application file for complete search history.

(56) References Cited

U.S. PATENT DOCUMENTS

| | | |
|---|---|---|
| 2006/0224280 A1 | 10/2006 | Flanigan et al. |
| 2011/0048153 A1* | 3/2011 | Standke ................ G05G 9/047 74/471 XY |
| 2013/0109272 A1 | 5/2013 | Rindlisbacher |
| 2014/0132082 A1 | 5/2014 | McGinn et al. |

FOREIGN PATENT DOCUMENTS

| | | | | |
|---|---|---|---|---|
| JP | 2002229656 A | * | 8/2002 | |
| JP | 2003-327002 A | | 11/2003 | |
| JP | 2004-217171 A | | 8/2004 | |
| JP | 2011-150470 A | | 8/2011 | |
| JP | 2018-136714 A | | 8/2018 | |
| KR | 10-0610184 B1 | | 8/2006 | |
| KR | 10-2017-0054186 A | | 5/2017 | |
| WO | WO-2019011589 A1 | * | 1/2019 | ......... B60G 17/0162 |

* cited by examiner

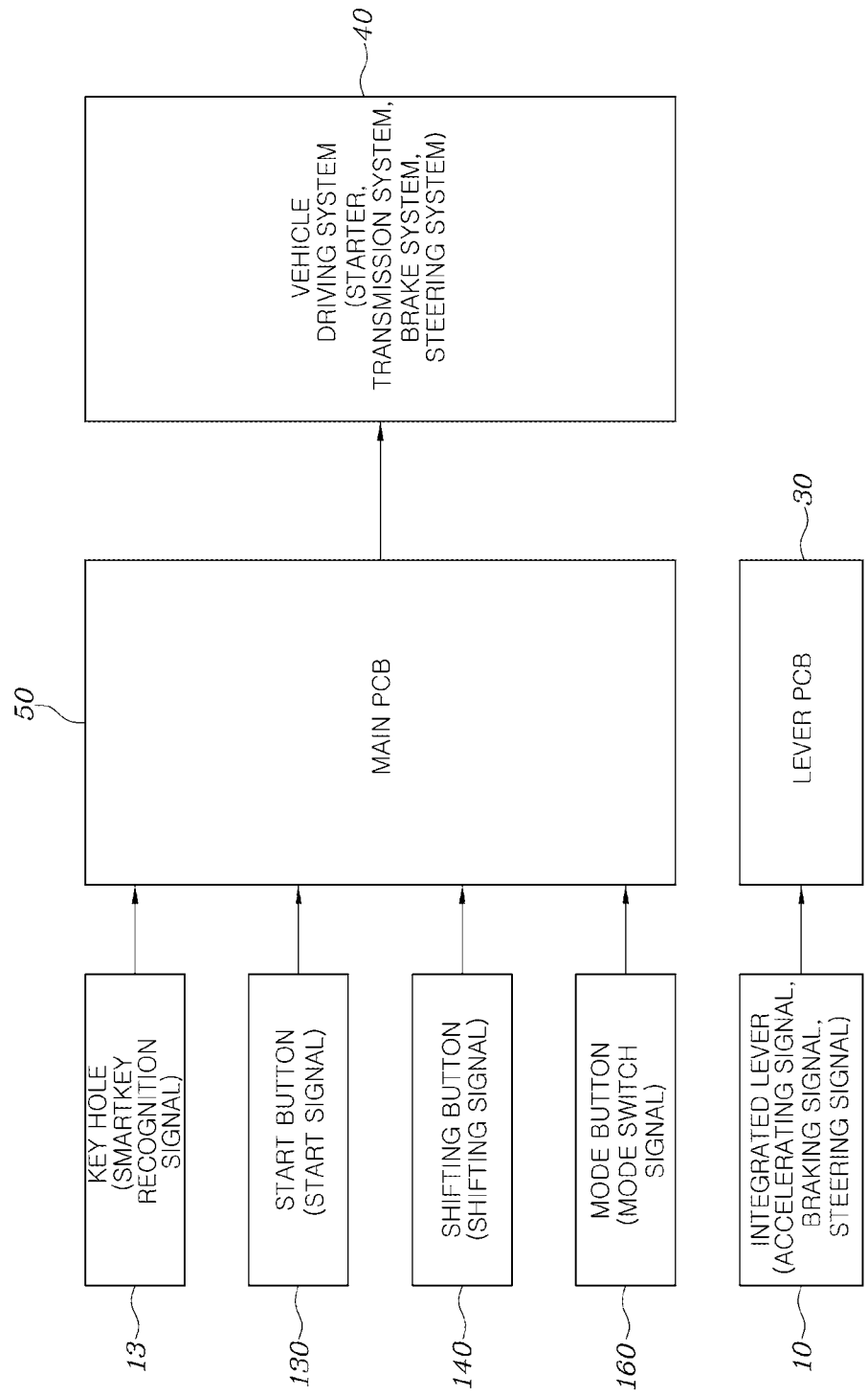

INTEGRATED CONTROL APPARATUS FOR AUTONOMOUS DRIVING VEHICLE

CROSS REFERENCE TO RELATED APPLICATION

The present application claims the benefit of priority to Korean Patent Application No. 10-2019-0041332, filed on Apr. 9, 2019 in the Korean Intellectual Property Office, the entire contents of which are incorporated herein by this reference.

TECHNICAL FIELD

The present disclosure relates to an integrated control apparatus for an autonomous driving vehicle. In particular, the present disclosure relates to an integrated control apparatus configured to be able to perform starting, shifting, accelerating, braking, and steering of a vehicle through a single integrated system for an autonomous driving vehicle.

BACKGROUND

In general, vehicles that are supposed to be manually driven by a driver have a device (start button) for starting up the vehicle, a device (shift lever) for shifting, devices (accelerator pedal and brake pedal) for accelerating and braking, and a device (steering wheel) for steering in the interior thereof.

If autonomous driving of a vehicle is realized, the desire for more efficiently using a wider interior would be increased. Further, if several devices described above are disposed at fixed positions in an autonomous driving vehicle, there is a defect that it is difficult to more efficiently use the interior in an autonomous driving situation, and particularly, there is a defect that it is uncomfortable to operate the vehicle in a relax mode.

The description provided above as a related art of the present disclosure is merely in order to help understanding of the background of the present disclosure and should not be construed as being included in the related art known by those skilled in the art.

SUMMARY

According to one aspect of the present disclosure, an integrated control apparatus is configured to perform starting, shifting, accelerating, braking, and steering of a vehicle through one integrated system, so that the integrated control apparatus can be easily used for autonomous driving vehicles, and a commercial value by increasing convenience can be more improved.

In view of the above aspect, an integrated control apparatus for an autonomous driving vehicle includes: an integrated lever being rotatable in different directions to accelerate, brake, and steer a vehicle; a lever magnet disposed on the integrated lever; a lever PCB detecting a position change of the lever magnet when the integrated lever is operated; and a main PCB outputting a control signal to a vehicle driving system in response to a signal from the lever PCB.

The vehicle driving system includes a starter, a transmission system, a brake system, a steering system, and an actuator for acceleration.

The integrated control apparatus further includes: a case to which the main PCB is fixed; a rotational actuator fixed to the case and being controlled to operate by the main PCB; and a transparent dome combined with the rotational actuator to be rotatable with respect to the case when the rotational actuator is operated, combined with the integrated lever such that the integrated lever can rotate in all directions of 360 degrees, and combined with the lever PCB fixed thereto to face the lever magnet.

The transparent dome includes a circular hole disposed at a central top of the transparent dome; the integrated lever is arranged to be fitted in the circular hole to be able to rotate in all directions of 360 degrees; and the lever PCB is fixed around the circular hole.

The integrated lever has: a dome coupling portion having an insertion groove fitted in the circular hole of the transparent dome and having the lever magnet fixed thereto; and an operation portion protruding upward from the dome coupling portion to be operated by a user.

The integrated control apparatus further includes a circular ring-shaped dome magnet coupled to the transparent dome around the circular hole, in which the lever magnet and the dome magnet have the same polarity to generate repulsion.

The lever magnet is positioned at a neutral position that is a center of the dome magnet when the integrated lever is not operated; and an accelerating signal is generated when the operation portion of the integrated lever is rotated forward from the neutral position, a braking signal is generated when the operation portion is rotated backward, and a steering signal is generated when the operation portion is rotated left and right.

The transparent dome is configured to rotate forward and backward with respect to the case when the rotational actuator is operated.

When the integrated lever is rotated forward, the rotational actuator is operated and the circular dome is rotated forward, such that center lines of the integrated lever and the circular dome are aligned to each other, and the main PCB generates a control signal for acceleration after the center lines of the integrated lever and the circular dome are aligned to each other.

The operation portion includes a key hole for inserting a smartkey, a start button is disposed on the case, and the main PCB generates a control signal for starting up a vehicle when the start button is operated with the smartkey inserted in the key hole.

Shifting buttons (P-, R-, N-, D-buttons) for selecting a drive mode are further disposed on the case, and the main PCB generates a control signal for shifting when the shifting buttons are operated during the vehicle is started up.

A mode button that changes functions of the start button and the shifting buttons into functions of a remote controller button or returns the functions of the remote controller button into the functions of the start button and the shifting buttons is further disposed on the case, and the functions of the mode button are operated in an autonomous driving situation.

The case is detachably attached to parts in a vehicle that can be electrically connected with the main PCB.

The integrated control apparatus further includes: a display coupled to the transparent dome to be horizontally positioned inside the transparent dome; and a model disposed at a center of the display.

A road image is shown through the display when the vehicle is started up; and the road image is implemented as if the model on the display moves in a driving direction when the vehicle is driven.

According to the integrated control apparatus of an exemplary embodiment of the present disclosure, since accelerating, braking, and steering of a vehicle can be implemented by one integrated lever, and the buttons for starting and shifting are disposed on one case together with the integrated lever, the integrated control apparatus can be easily used for an autonomous vehicle. In particular, the integrated control apparatus is attachable and detachable, so convenience and commercial value can be improved.

BRIEF DESCRIPTION OF THE DRAWINGS

The above and other aspects, features and advantages of the present disclosure will be more apparent from the following detailed description taken in conjunction with the accompanying drawings, in which:

FIG. 11 is a block diagram schematically showing the configuration of an integrated control apparatus according to an exemplary embodiment of the present disclosure.

Figure 1:
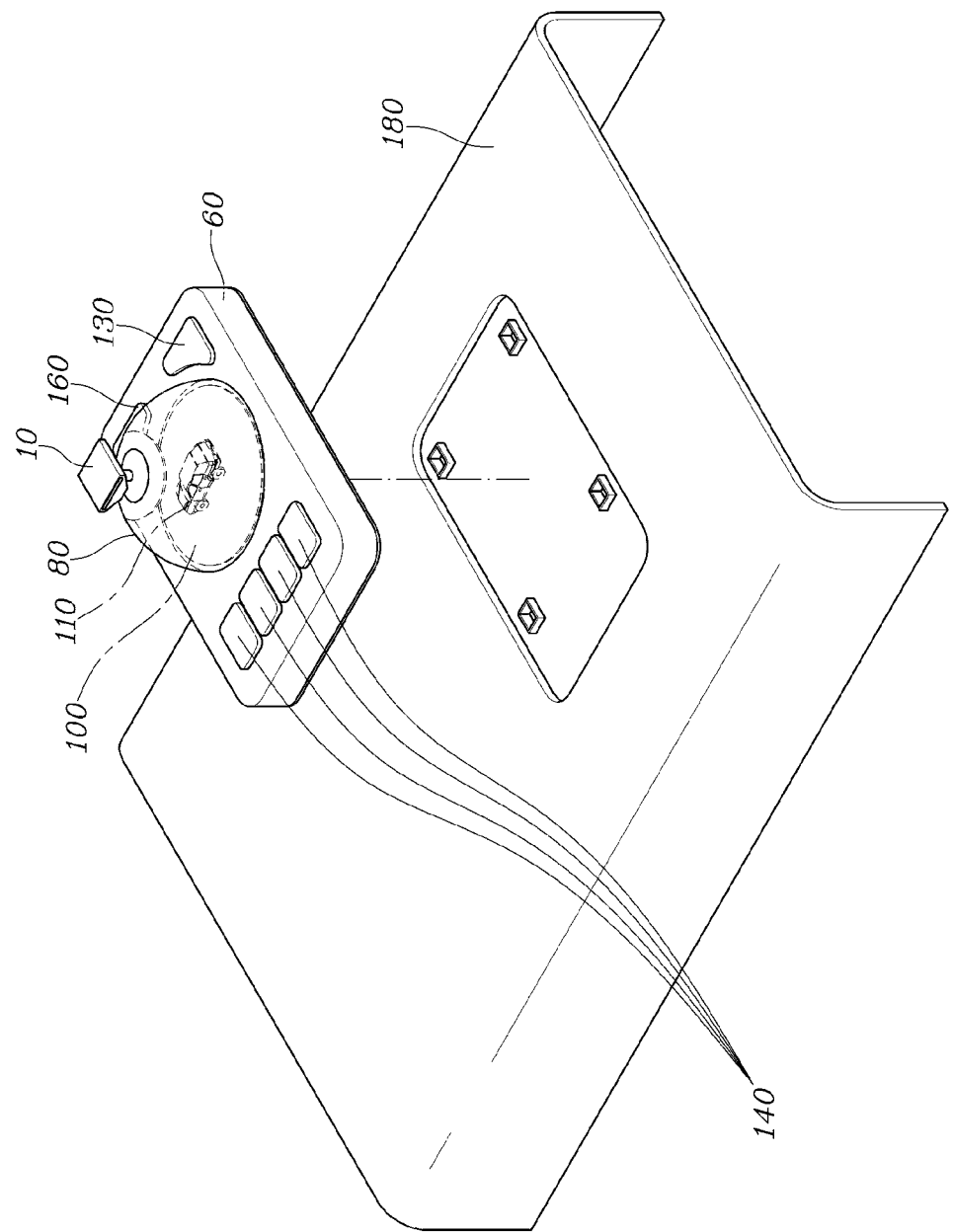
FIG. 1 is a view showing an integrated control apparatus for an autonomous driving vehicle that is detachably attached to a console according to an exemplary embodiment of the present disclosure.
Figure 2:
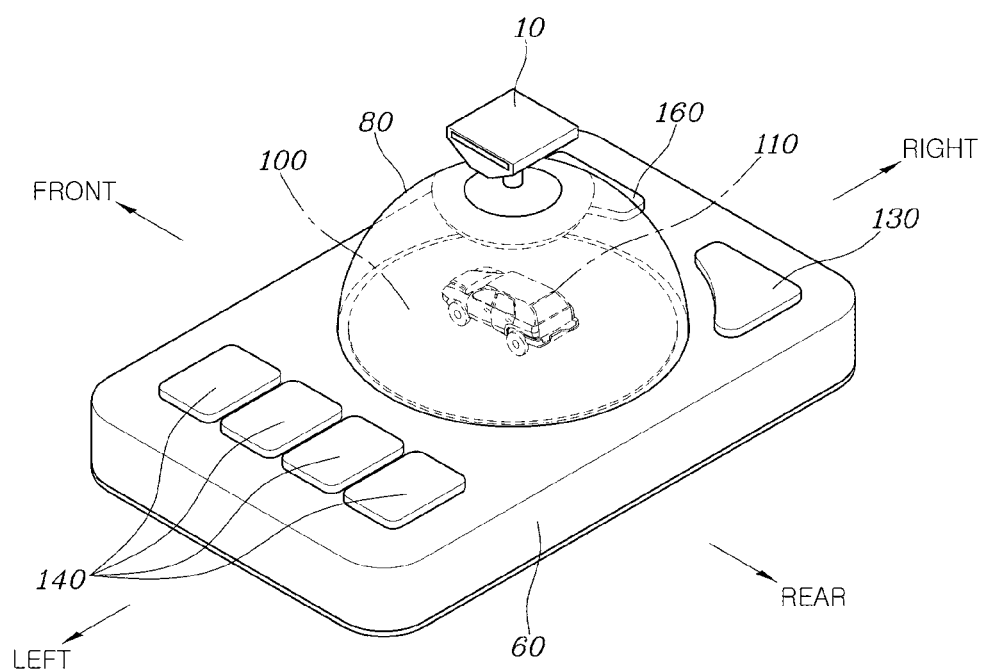
FIG. 2 is a perspective view of the integrated operation apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

DETAILED DESCRIPTION

Reference will now be made in detail to various embodiments of the present disclosure, examples of which are illustrated in the accompanying drawings and described below. While the inventive concept(s) will be described in conjunction with exemplary embodiments of the present disclosure, it will be understood that the present description is not intended to limit the invention(s) to those exemplary embodiments. On the other hand, the inventive concept(s) is/are intended to cover not only the exemplary embodiments of the present disclosure, but also various alternatives, modifications, equivalents and other embodiments, which may be included within the spirit and scope of the invention as defined by the appended claims.

An integrated control apparatus for an autonomous driving vehicle according to exemplary embodiments of the present disclosure is described hereafter in detail with reference to the accompanying drawings.

An integrated control apparatus for an autonomous driving vehicle according to the present disclosure, as shown in FIGS. 1 to 11, includes: one integrated lever 10 being rotatable in different directions to accelerate, brake, and steer a vehicle; a lever magnet 20 disposed on the integrated lever 10; a lever Printed Circuit Board (PCB) 30 detecting a position change of the lever magnet 20 when the integrated lever 10 is operated; and a main PCB 50 outputting a control signal to a vehicle driving system 40 in response to a signal from the lever PCB 30.

The vehicle driving system 40 includes a starter, a transmission system, a brake system, a steering system, and an actuator for acceleration.

The present disclosure further includes: a case 60 to which the main PCB 50 is fixed; a rotational actuator 70 fixed to the case 60 and being controlled to rotate by the main PCB 50; and a transparent dome 80 combined with the rotational actuator 70 to be rotatable with respect to the case 60 by the rotational actuator 70, combined with the integrated lever 10 such that the integrated lever 10 can rotate in all directions of 360 degrees, and combined with the lever PCB 30 fixed thereto to face the lever magnet 20.

The case 60 is an assembly of an upper case 61 and a lower case 62, the main PCB 50 is fixed on the lower case 62, and the rotational actuator 70 is fixed to the inner side of the top of the upper case 61.

The rotational actuator 70 is a step motor having a motor shaft that can rotate clockwise and counterclockwise. Two rotational actuators 70 are provided and disposed at the left and right sides to face each other.

A circular case hole 61a is formed vertically through the upper case 61, the lower end of the semispherical transparent dome 80 is rotatably inserted in the case hole 61a, and the motor shafts of the rotational actuators 70 are integrally coupled to the lower end of the transparent dome 80 exposed in the upper case 61 through the case hole 61a.

Accordingly, when the rotational actuators 70 are operated, the transparent dome 80 rotates forward/backward with respect to the upper case 61.

A circular hole 81 is formed at the central top of the transparent dome 80, the integrated lever 10 is fitted in the circular hole 81 to be able to rotate in all directions of 360 degrees, and the lever PCB 30 is fixed around the circular hole 81.

The integrated lever 10 has a dome coupling portion 11 having an insertion groove 11a fitted in the circular hole 81 of the transparent dome 80 and having the lever magnet 20 fixed thereto, and an operation portion 12 protruding upward from the dome coupling portion 11 to be operated by a user.

A circular ring-shaped dome magnet 90 is coupled around the circular hole 81 of the transparent dome 80.

The lever magnet 20 and the dome magnet 90 have the same polarity (N-polarity or S-polarity) to generate repulsion therebetween. Accordingly, when the integrated lever 10 is rotated in a direction, a force that returns the integrated lever 10 to the neutral position is always applied to the integrated lever 10 by the lever magnet 20 and the dome magnet 90.

The intensity of the lever magnet 20 is larger than that of the dome magnet 90 so that an accelerating signal, a braking signal, and a steering signal can be generated well when the integrated lever 10 is operated.

Without the integrated lever 10 operated, the lever magnet 20 is positioned at the center of the dome magnet 90 by the repulsion between the lever magnet 20 and the dome magnet 90, and in this state, the integrated lever 10 is maintained at the neutral position.

When the operation portion 12 of the integrated lever 10 is rotated forward from the neutral position, the lever magnet 20 coupled to the dome coupling portion 11 is moved backward, the lever PCB 30 detects a change in magnetic flux due to the position change of the lever magnet 20 and transmits a signal to the main PCB 50, and the main PCB 50 transmits an accelerating signal to the vehicle driving system 40 so that the vehicle is accelerated.

When the operation portion 12 of the integrated lever 10 is rotated backward from the neutral position, the main PCB 50 transmits a braking signal to the vehicle driving system 40 so that the vehicle is braked. When the operation portion 12 of the integrated lever 10 is rotated left and right, the vehicle is steered.

Figure 3:
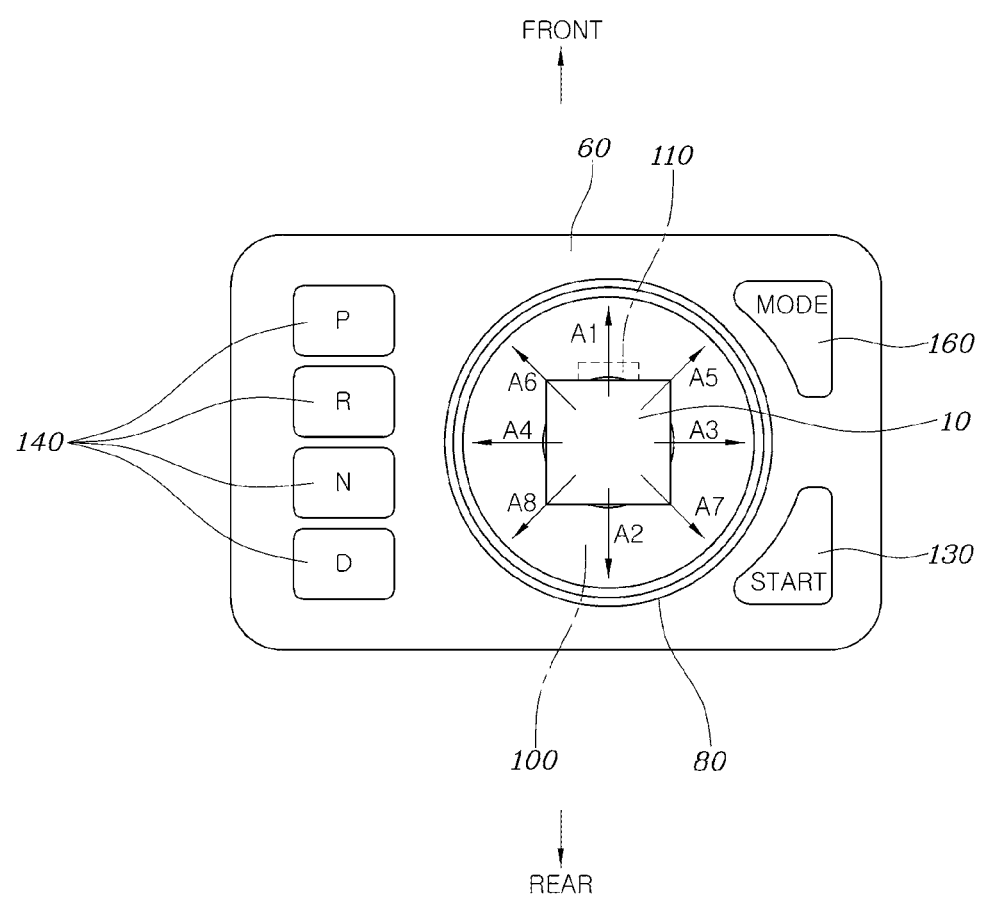
FIGS. 3 and 4 are a plan view and a right side view of FIG. 2.
Figure 4:
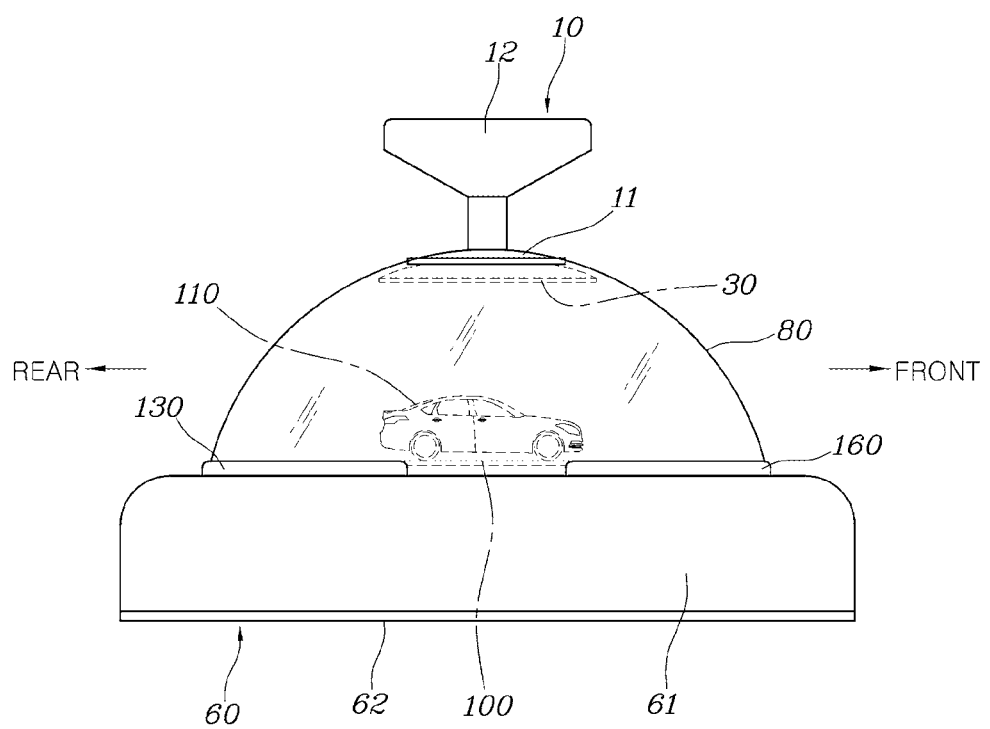
Figure 5:
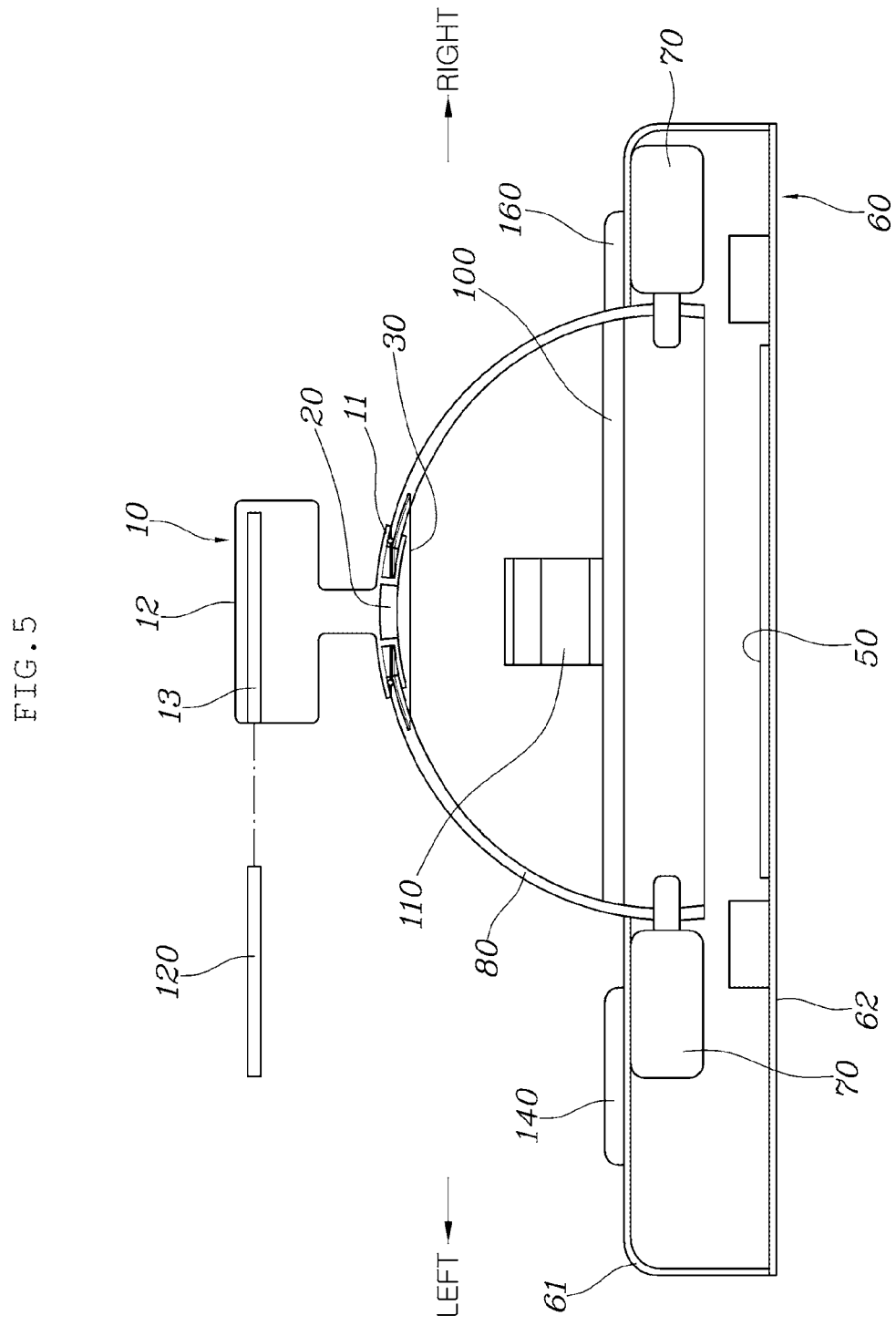
FIG. 5 is a front view of FIG. 3 which shows the internal structure of a case.
Figure 6:
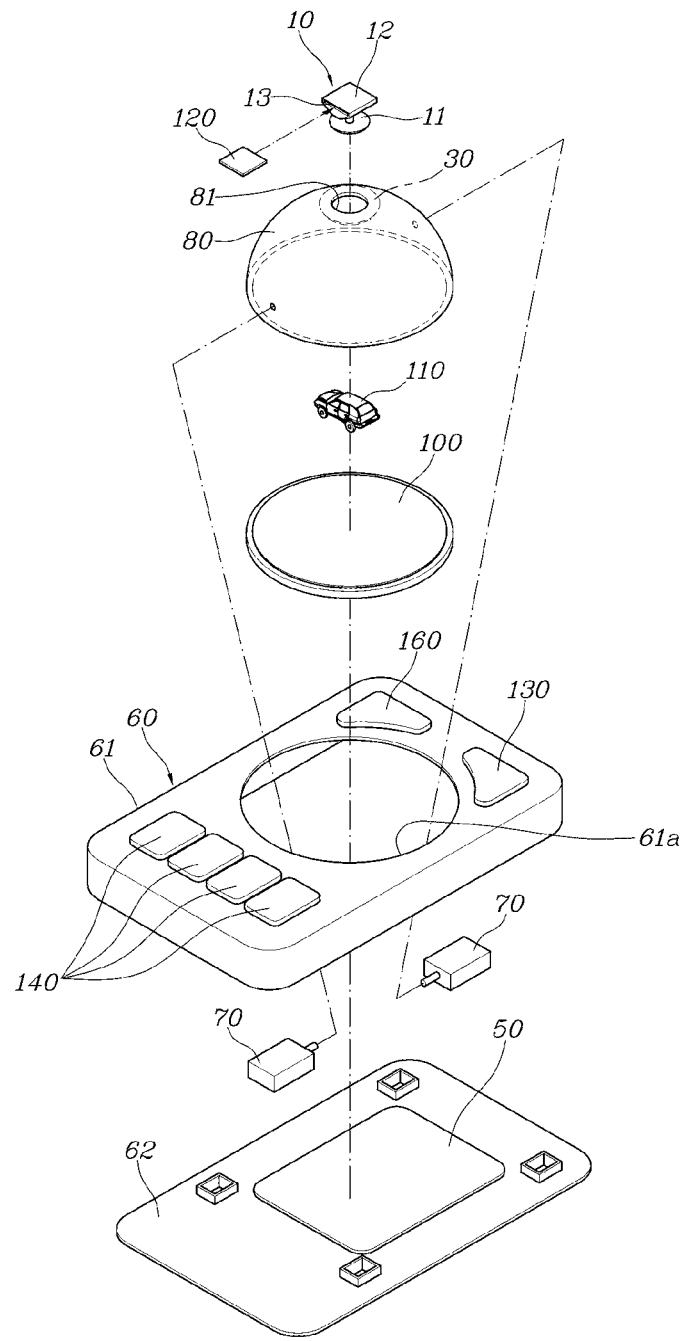
FIG. 6 is an exploded perspective view of the integrated operation apparatus according to an exemplary embodiment of the present disclosure.
Figure 7:
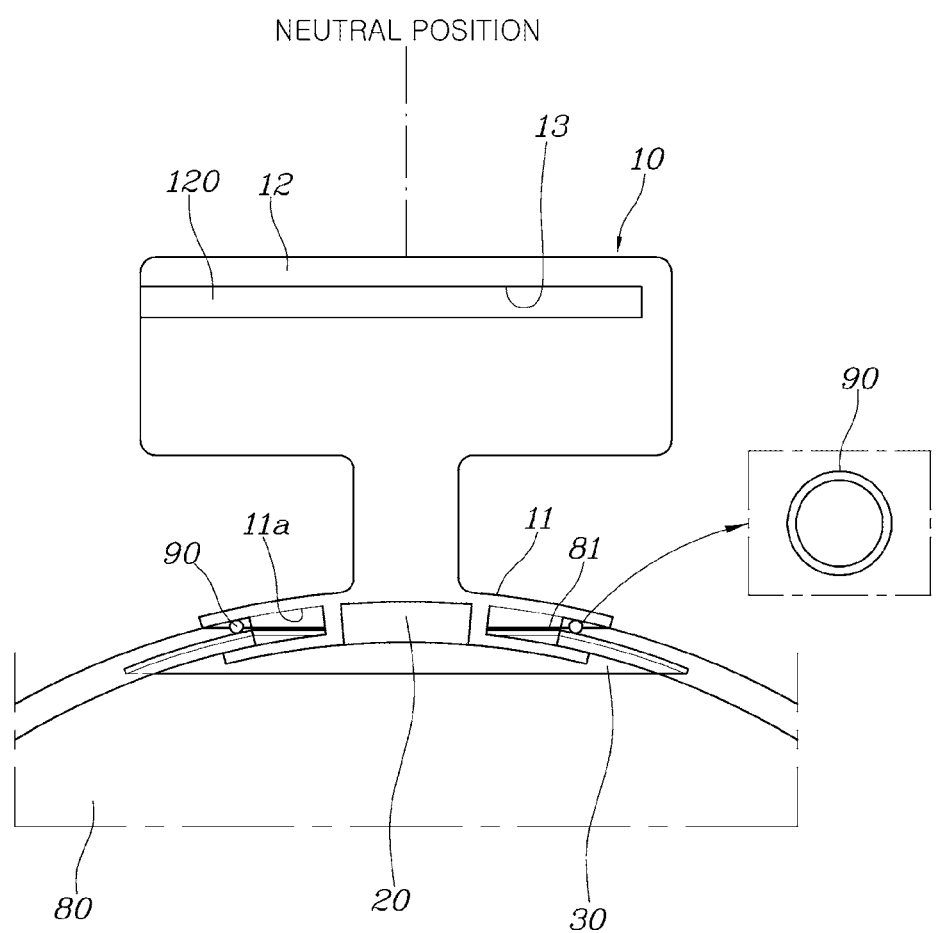
FIG. 7 is a cross-sectional view illustrating a coupling structure of an integrated lever.

The rotation directions of the integrated lever 10 are indicated by arrows in FIG. 3. The arrow A1 indicates a straight accelerating direction, the arrow A2 indicates a braking direction, the arrows A3 and A4 indicate left and right turn, the arrows A5 and a6 indicate left and right acceleration turn, and the arrows A7 and A8 indicate left and right braking turn.

The present disclosure further includes a display 100 coupled to the transparent dome 80 to be horizontally positioned inside the transparent dome 80, and a model 110 disposed at the center of the display 100.

The model 110 may be a miniature of a vehicle or miniatures of various characters.

Figure 8:
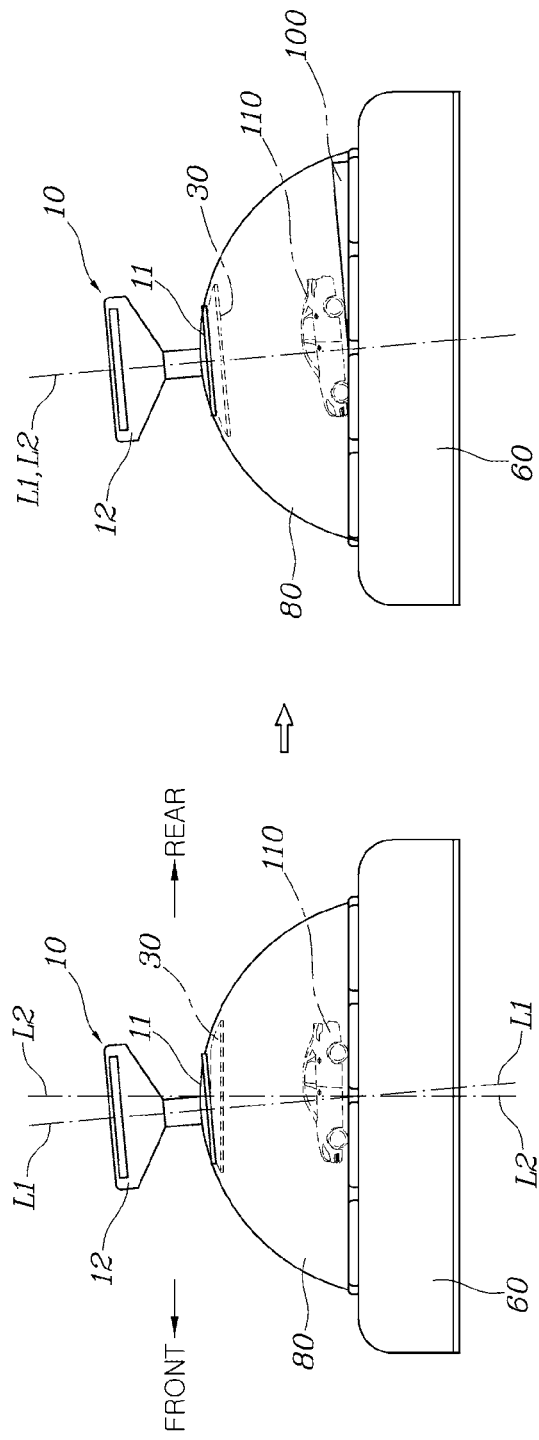
FIG. 8 is a view illustrating the state when the shift lever has been rotated forward.
Figure 9:
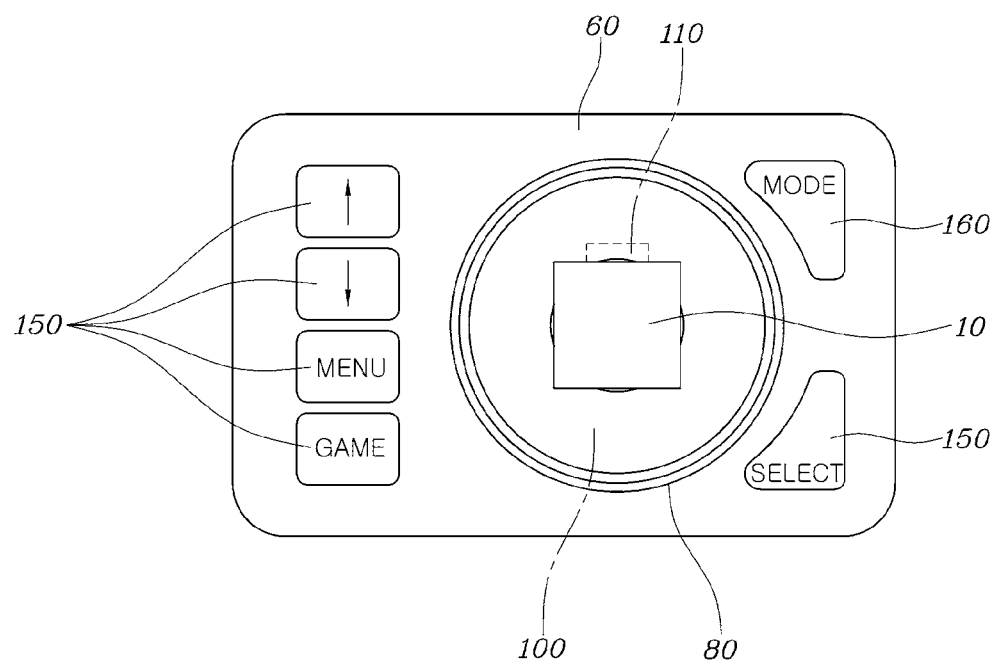
FIG. 9 is a view showing the state when a mode button has been operated and a start button and shifting buttons have been changed into a remote controller button.
Figure 10:
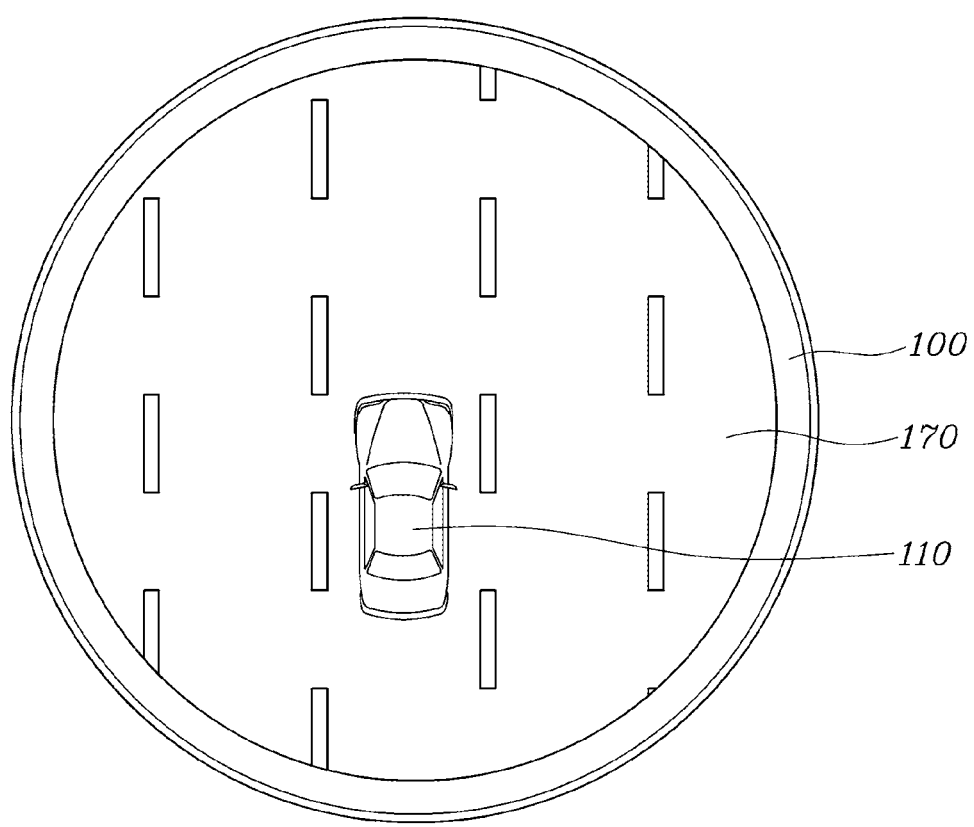
FIG. 10 is a view when a road image is shown on a display.

When the integrated lever 10 at the neutral position is operated and rotated forward, as in (A) of FIG. 8, the center line L1 of the integrated lever 10 inclines forward, so the center line L1 of the integrated lever 10 and the center line L2 of the transparent dome 80 stray from each other. As the center lines L1 and L2 stray from each other, the transparent dome 80 is rotated forward, as in (B) of FIG. 8, by operation of the rotational actuators 70 controlled by the main PCB 50. Accordingly, the center lines L1 and L2 are aligned back to each other and then the main PCB 50 generates a control signal for acceleration.

That is, when the integrated lever 10 at the neutral position is rotated forward, the transparent dome 80 and the display 100 and model 110 combined with the transparent dome 80 are also rotated and inclined forward.

When the integrated lever 10 is rotated forward, an accelerating signal is generated and a driver can visually recognize the display 100 and the model 110 rotated and inclined forward, so the driver receives feedback showing whether the integrated lever 10 has been correctly operated in accordance with the driver's intention.

If the integrated lever 10 is rotated forward by mistake when braking is required, the driver can quickly recognize mis-operation by visually recognizing the display 100 and the model 110 inclined forward and can quickly take normal operation before the center lines L1 and L2 are aligned, whereby it is possible to maximally prevent an accident due to mis-operation.

The main PCB 50 may be configured to generate a control signal for braking after the center lines L1 and L2 are aligned when the integrated lever 10 is rotated backward, but it would be preferable that braking is immediately performed even though the center lines L1 and L2 are not aligned when the integrated lever 10 is rotated backward in consideration of safety in a braking situation.

A key hole 13 for inserting a smartkey 120 is formed at the operation portion 12 of the integrated lever 10, a start button 130 is disposed on the case 60, and the main PCB 50 generates a control signal for starting up the vehicle to the vehicle driving system 40 only when the start button 130 is operated with the smartkey 120 inserted in the key hole 13 (that is, with a recognition signal of the smartkey generated).

Shifting buttons 140 (P-, R-, N-, D-buttons) for selecting a drive mode of the vehicle are further disposed on the case 60 and the main PCB 50 generates a control signal for shifting to the vehicle driving system 40 only when the shifting buttons 140 are operated during the vehicle is started up.

A mode button 160 that changes the functions of the start button 130 and the shifting buttons 140 into the functions of a remote controller button 150 or returns the functions of the remote controller button 150 into functions of the start button 130 and the shifting buttons 140 is further disposed on the case 60.

The remote controller button 150 includes a menu button for operating an air conditioner, a radio, interior lights, an AVN, etc., a game button for selecting games, up-/down-buttons, a selection button, etc., and it is preferable that the functions of the mode button 160 are performed only in an autonomous driving situation.

It is safe that the mode by the start button 130 and the shifting buttons 140 is maintained even though the mode button 160 is operated in a manual driving situation. Further, it is preferable to maintain the mode by the start button 130 and the shifting buttons 140 for safety in the early stage after the vehicle is started up.

It is preferable that the integrated control apparatus according to the present disclosure is configured to be detachably attached for use to any desired parts in a vehicle. In particular, the integrated control apparatus may be configured to the detachably attached to parts in a vehicle by various coupling structures such as using a magnet or a coupler as long as the parts can be electrically connected with the main PCB 50 when the case 60 is attached.

Reference numeral '180' indicates a console in FIG. 1.

The integrated control apparatus according to the present disclosure may also be configured to display a road image 170 through a display 100 when the vehicle is started up. In this case, the road image 170 may be implemented as a moving image as if the model 100 on the display 100 moves in the driving direction when the vehicle is driven.

As described above, according to the integrated control apparatus of an embodiment of the present disclosure, since accelerating, braking, and steering of a vehicle can be implemented by one integrated lever 10, and the buttons for starting and shifting of a vehicle are disposed on one case 60 together with the integrated lever 10, the integrated control apparatus can be easily used for an autonomous driving vehicle. In particular, the integrated control apparatus is attachable and detachable, so convenience and commercial value can be improved.

Although the present disclosure was described with reference to specific embodiments shown in the drawings, it is apparent to those skilled in the art that the present disclosure may be changed and modified in various ways without departing from the scope of the present disclosure, which is described in the following claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

What is claimed is:

1. An integrated control apparatus for an autonomous driving vehicle, the integrated control apparatus comprising:
   an integrated lever being rotatable in different directions to accelerate, brake, and steer a vehicle;
   a lever magnet disposed on the integrated lever;
   a lever Printed Circuit Board (PCB) detecting a position change of the lever magnet when the integrated lever is operated;
   a main PCB outputting a control signal to a vehicle driving system in response to a signal from the lever PCB
   a case to which the main PCB is fixed;
   a rotational actuator fixed to the case and being controlled to be operated by the main PCB; and
   a transparent dome combined with the rotational actuator to be rotatable with respect to the case when the rotational actuator is operated, combined with the integrated lever such that the integrated lever can rotate in a predetermined direction, and combined with the lever PVB fixed thereto to face the lever magnet.

2. The integrated control apparatus of claim 1, wherein the vehicle driving system includes a starter, a transmission system, a brake system, a steering system, and an actuator for acceleration.

3. The integrated control apparatus of claim 1, wherein transparent dome combined with the integrated lever such that the integrated lever can rotate in all directions of 360 degrees.

4. The integrated control apparatus of claim 3, wherein the transparent dome includes a circular hole disposed at a central top of the transparent dome;
   the integrated lever is arranged to be fitted in the circular hole to be able to rotate in all directions of 360 degrees; and
   the lever PCB is fixed around the circular hole.

5. The integrated control apparatus of claim 4, wherein the integrated lever has:
   a dome coupling portion having an insertion groove fitted in the circular hole of the transparent dome and having the lever magnet fixed thereto; and
   an operation portion protruding upward from the dome coupling portion to be operated by a user.

6. The integrated control apparatus of claim 5, further comprising a circular ring-shaped dome magnet coupled to the transparent dome around the circular hole,
   wherein the lever magnet and the dome magnet have the same polarity to generate repulsion.

7. The integrated control apparatus of claim 6, wherein the lever magnet is positioned at a neutral position that is a center of the dome magnet when the integrated lever is not operated, and
   an accelerating signal is generated when the operation portion of the integrated lever is rotated forward from the neutral position, a braking signal is generated when the operation portion is rotated backward, and a steering signal is generated when the operation portion is rotated left and right.

8. The integrated control apparatus of claim 7,
   wherein the transparent dome is configured to rotate forward and backward with respect to the case when the rotational actuator is operated.

9. The integrated control apparatus of claim 8, wherein when the integrated lever is rotated forward, the rotational actuator is operated and the transparent dome is rotated forward, such that center lines of the integrated lever and the transparent dome are aligned to each other, and
   the main PCB generates a control signal for acceleration after the center lines of the integrated lever and the transparent dome are aligned to each other.

10. The integrated control apparatus of claim 5, wherein the operation portion includes a key hole for inserting a smartkey;
    a start button is disposed on the case; and
    the main PCB generates a control signal for starting up the vehicle when the start button is operated with the smartkey inserted in the key hole.

11. The integrated control apparatus of claim 10, wherein shifting buttons (P-, R-, N-, D-buttons) for selecting a drive mode are further disposed on the case; and
    the main PCB generates a control signal for shifting when the shifting buttons are operated during the vehicle is started up.

12. The integrated control apparatus of claim 11, wherein a mode button that changes functions of the start button and the shifting buttons into functions of a remote controller button or returns the functions of the remote controller button into the functions of the start button and the shifting buttons is further disposed on the case, and
    functions of the mode button are operated in an autonomous driving situation.

13. The integrated control apparatus of claim 3, wherein the case is detachably attached to parts in a vehicle that can be electrically connected with the main PCB.

14. The integrated control apparatus of claim 3, further comprising:
    a display coupled to the transparent dome to be horizontally positioned inside the transparent dome; and
    a model disposed at a center of the display.

15. The integrated control apparatus of claim 14, wherein a road image is shown through the display when the vehicle is started up; and
    the road image is implemented as if the model on the display moves in a driving direction when the vehicle is driven.

* * * * *